(12) United States Patent
Soldner et al.

(10) Patent No.: US 11,002,851 B2
(45) Date of Patent: May 11, 2021

(54) ULTRASONIC SENSOR

(71) Applicant: Apple Inc., Cupertino, CA (US)

(72) Inventors: Nicholas C. Soldner, Mountain View, CA (US); Arthur Y. Zhang, San Jose, CA (US); Tushar Gupta, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/563,068

(22) Filed: Sep. 6, 2019

(65) Prior Publication Data

US 2020/0081120 A1    Mar. 12, 2020

Related U.S. Application Data

(60) Provisional application No. 62/727,780, filed on Sep. 6, 2018.

(51) Int. Cl.
*G01S 15/04* (2006.01)
*G01S 15/00* (2020.01)

(52) U.S. Cl.
CPC ............ *G01S 15/04* (2013.01); *G01S 15/003* (2013.01)

(58) Field of Classification Search
CPC .............................. G01S 15/04; G01S 15/003
USPC ........................................................... 340/93
See application file for complete search history.

(56) References Cited

U.S. PATENT DOCUMENTS

| | | | | | |
|---|---|---|---|---|---|
| 4,084,582 | A | * | 4/1978 | Nigam | A61B 8/00 367/150 |
| 4,551,825 | A | * | 11/1985 | Biber | G01S 15/102 367/101 |
| 4,837,574 | A | * | 6/1989 | Hill | G01S 13/04 342/27 |
| 4,954,837 | A | * | 9/1990 | Baird | G01C 21/005 342/458 |
| 2006/0125919 | A1 | * | 6/2006 | Camilleri | H04N 7/183 348/148 |
| 2007/0041872 | A1 | * | 2/2007 | Perng | H01M 8/04201 422/62 |
| 2008/0036649 | A1 | * | 2/2008 | Lyon | G01S 13/10 342/174 |
| 2012/0206289 | A1 | * | 8/2012 | Allam | G01S 13/87 342/107 |
| 2013/0261821 | A1 | * | 10/2013 | Lu | G08C 17/02 700/289 |
| 2014/0187946 | A1 | * | 7/2014 | Miller | A61B 8/54 600/440 |
| 2014/0269190 | A1 | * | 9/2014 | Yoda | G01S 15/02 367/87 |
| 2014/0291498 | A1 | * | 10/2014 | Lewkow | H01L 27/14618 250/234 |
| 2015/0023138 | A1 | * | 1/2015 | Liu | G01S 15/876 367/124 |

(Continued)

*Primary Examiner* — Ojiako K Nwugo
(74) *Attorney, Agent, or Firm* — Blank Rome LLP

(57) ABSTRACT

Object detection may include transmitting, by a first device, a first pulse into an environment using a wide field configuration of an ultrasonic sensor array, detecting a presence of an object in the environment based on a detected echo based on the first pulse. In response to detecting the presence of the object, a targeted configuration of the ultrasonic sensor array is determined, and a second pulse is transmitted into the environment based on the second pulse, wherein a characteristic of the object is determined based on a detected echo from the second pulse.

16 Claims, 7 Drawing Sheets

(56) References Cited

U.S. PATENT DOCUMENTS

| | | | |
|---|---|---|---|
| 2015/0301153 A1* | 10/2015 | Foxlin | G01S 3/7835 |
| | | | 367/128 |
| 2016/0011305 A1* | 1/2016 | Koptenko | G01S 7/52047 |
| | | | 367/7 |
| 2017/0113613 A1* | 4/2017 | Van Dan Elzen | H04N 5/2351 |
| 2018/0005176 A1* | 1/2018 | Williams | G06Q 10/08 |
| 2018/0101177 A1* | 4/2018 | Cohen | H04N 7/181 |
| 2018/0101813 A1* | 4/2018 | Paat | H04N 7/185 |
| 2018/0128922 A1* | 5/2018 | Justice | G01S 17/66 |
| 2018/0309917 A1* | 10/2018 | Kim | H04N 5/2357 |
| 2019/0066324 A1* | 2/2019 | Hodge | G06T 7/70 |
| 2019/0086971 A1* | 3/2019 | Sanders | G06F 1/1694 |

* cited by examiner

US 11,002,851 B2

ULTRASONIC SENSOR

BACKGROUND

This disclosure relates generally to the field of object detection, and more particularly to the field of utilizing an ultrasonic sensor for detecting objects that are otherwise difficult to detect.

Today's electronic devices provide users with many ways to interact with the world around them. For example, users may interact with electronic devices using electronic devices which may aid in detecting and identifying objects in an environment. For example, some devices provide visual-based object detection, in which cameras are utilized to detect and identify an object in an environment. However, some items are difficult to detect in an environment. For example, items may be outside a field of view of a camera, or may be difficult to detect by a camera. As an example, transparent or glass walls, doors, and the like may be difficult to detect by visual-based object detection. Mirrors may be another example of a type of item that may be difficult to detect using visual-based object detection. Accordingly, what is needed is an improved system and method to detect objects in an environment.

SUMMARY

In one embodiment, a method for object detection is described. The method may include transmitting, by a first device, a first pulse into an environment using a wide field configuration of an ultrasonic sensor array, detecting a presence of an object in the environment based on a detected echo based on the first pulse. In response to detecting the presence of the object, a targeted configuration of the ultrasonic sensor array is determined, and a second pulse is transmitted into the environment based on the second pulse, wherein a characteristic of the object is determined based on a detected echo from the second pulse.

In another embodiment, the method may be embodied in computer executable program code and stored in a non-transitory storage device. In yet another embodiment, the method may be implemented in an electronic device.

DETAILED DESCRIPTION

Figure 1:
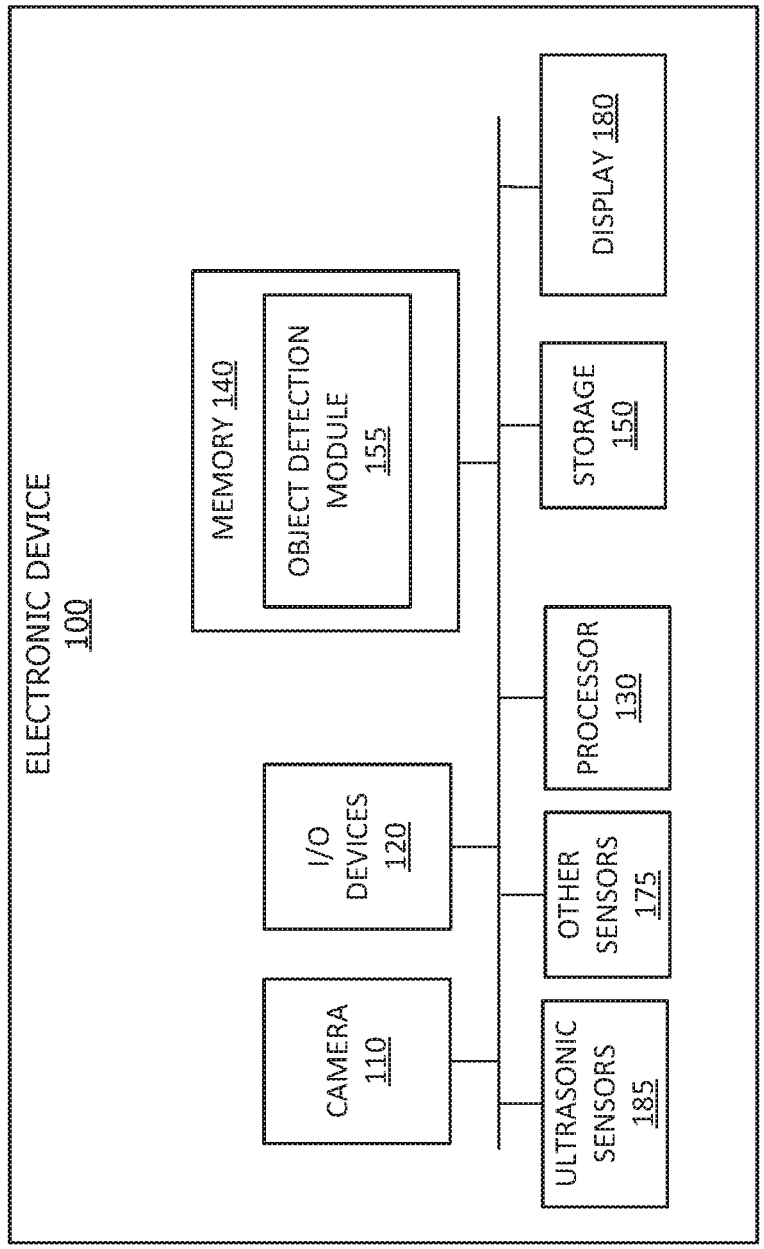
FIG. 1 shows, in block diagram form, a simplified system diagram according to one or more embodiments.

This disclosure pertains to systems, methods, and computer readable media for utilizing ultrasonic sensors on a head mounted device. By incorporating ultrasonic sensors into a head mounted device, a system may more accurately detect obstacles and alert users to obstructions in a physical environment. In one or more embodiments, the addition of ultrasonic sensors to a head mounted device provides detection capabilities for objects that are not typically detectable, or which are difficult to detect, by traditional vision and depth cameras provided on a headset. For example, walls, doors, windows, and large mirrors may be difficult to detect, but one or more ultrasonic sensors affixed to a head mounted device may be utilized to detect those objects and alert the user such that the user may avoid walking into them. In one or more embodiments, the user may utilize a head mounted device in a manner such that the user may not see the objects, such as in a virtual reality mode, and/or if the user is walking or otherwise moving backwards, in the direction of the back of the head.

Another way that ultrasonic sensors may be used on a head mounted device are to enhance a user experience. For example, glass tabletops and other surfaces may make accurate placement of virtual objects in an environment challenging. By utilizing ultrasonic sensors, real world items in the environment may be better identified and located such that virtual objects may be more accurately placed in the environment.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram or flow chart is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Figure 5:
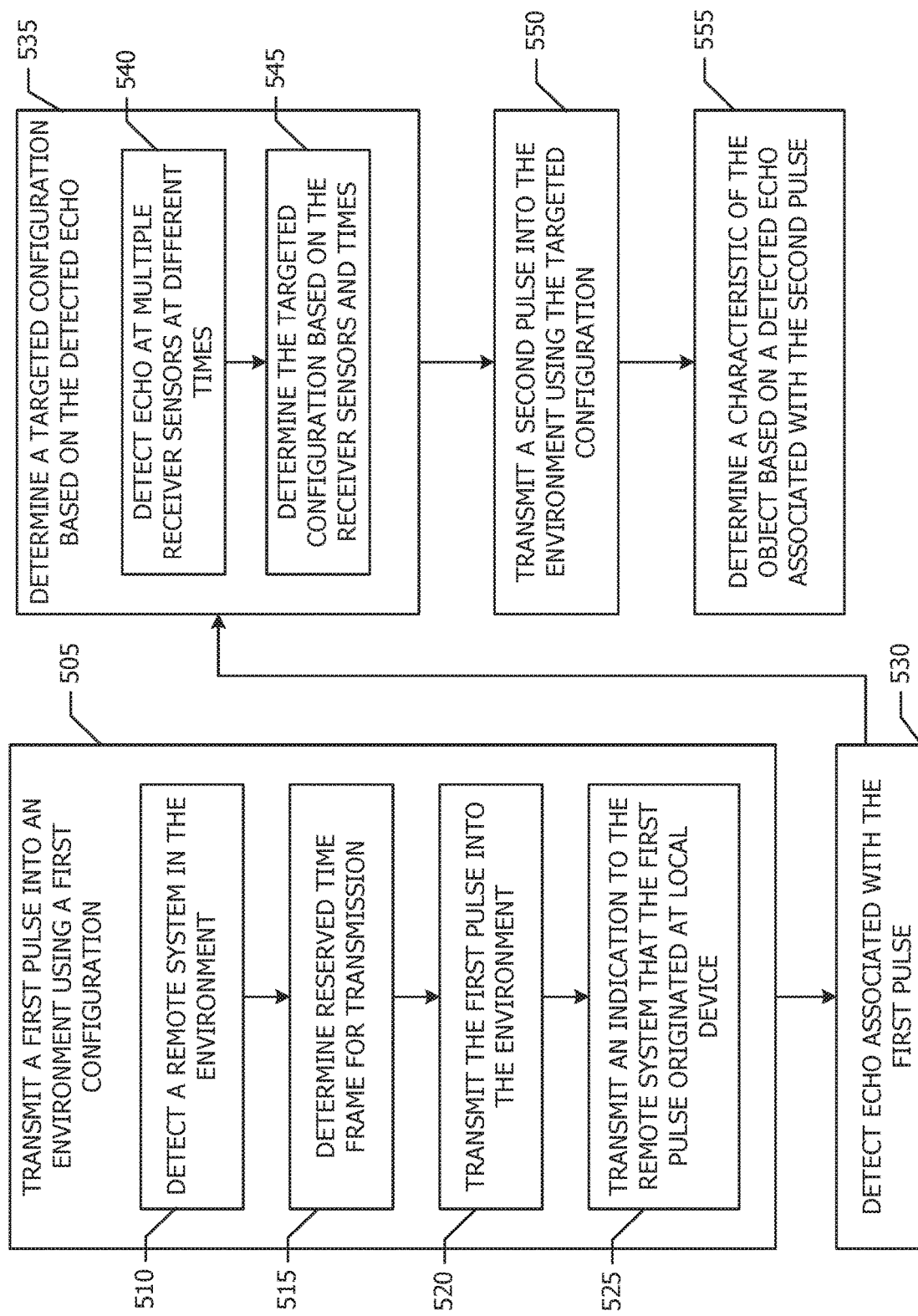
FIG. 5 depicts a flowchart describing a method for object detection, according to one or more embodiments.

Referring to FIG. 1, a simplified block diagram of an electronic device 100 is depicted in accordance with one or more embodiments of the disclosure. Electronic device 100 may be part of a multifunctional device such as a head mounted device, as shown in FIG. 5. Electronic Device 100 may be connected to other devices across a network such as other mobile devices, tablet devices, desktop devices, head mounted devices, as well as network storage devices such as servers and the like.

Electronic Device 100 may include a processor 130. Processor 130 may be a central processing unit (CPU). Processor 130 may alternatively, or additionally, include a system-on-chip such as those found in mobile devices and include zero or more dedicated graphics processing units (GPUs). Electronic Device 100 may also include memory 140 and storage 150. Memory 140 and storage 150 may each include one or more different types of memory, which may be used for performing device functions in conjunction with processor 130. For example, memory 140 may include cache, ROM, and/or RAM. Memory 140 may store various programming modules during execution, including image processing module 155. In one or more embodiments, storage 150 may comprise cache, ROM, RAM, and/or non-volatile memory.

Electronic device 100 may include one or more cameras 110. Each camera 110 may include an image sensor, a lens stack, and other components that may be used to capture images. Further, in some embodiments image sensors may be shared between different lens stacks. In one or more embodiments, cameras 110 may be configured to capture still pictures, or video feed.

Electronic device 100 may include one or more sensors 175, which may provide information about a surrounding environment. For example, sensors 175 may include sensors configured to detect brightness, depth, location, and other information regarding the environment. In addition, electronic device 100 may include ultrasonic sensors 185. Ultrasonic sensors may be integrated into the electronic device in a number of ways. For example, ultrasonic sensors may be integrated individually, in a predetermined pattern, in one or more sensor arrays, and the like. Electronic device 100 may also include a display 180, which may be an additive display. For example, display 180 may be a transparent or semi-opaque display, such as a heads-up display, by which an image may be projected over a transparent surface. Thus, display 180 may be comprised of a projector and a surface, or may just include the projector. Further, display 180 may be a transparent display, such as an LCD display and/or a display in a head mounted device. Electronic device 100 may additionally include I/O devices 120, such as speakers, microphones, and the like.

Memory 140 may include instructions, such as computer readable code executable by processor 130 to perform various actions. For example, object detection module 155 may include instructions that cause electronic device 100 to assist in detecting objects in an environment. object detection module may utilize data gathered from ultrasonic sensors 185 or other sensors 175.

In one embodiment ultrasonic sensors 185 may be used to provide a focused scan of space. The ultrasonic sensors 185 may be uniform or may have different characteristics. As an example, one or more of the ultrasonic sensors may have a different field of view (e.g., may have a different coverage area). The ultrasonic sensors 185 may be integrated into a head mounted device such that the ability for the head mounted device to localize objects in a real environment is improved. For example, beamforming may be improved. The sensors 185 may be networked to a same time base. The sensors 185 may then be used to beamform by launching energy into space using the common time base. As such, multiple ultrasonic sensors 185 may be configured in a modular manner while still providing beamforming capabilities.

In addition, a coverage of scanned space may be improved by integrating the sensors 185 onto a system in a manner particular to the shape of the system and/or the environment. That is, the ultrasonic sensors 185 may be affixed into the electronic device 100 in a manner such that coverage of scanned space is improved or optimized, for example, based on a geometry of the electronic device 100. Further, coverage of the scanned environment may be improved by utilizing ultrasonic sensors 185 with a variety of fields of view. Moreover, in one or more embodiments, the scan of space may be improved by utilizing ultrasonic sensors to enhance a scan of an environment using other sensors 175, for example cameras 110, such as depth cameras or RGB cameras. In one or more embodiments, an optimal combination of elements to obtain an improved or best combination of accuracy of the scan of the environment and a completeness of a scan of the environment may be utilized. The improved combination may be a combination that satisfies a predetermined threshold for accuracy, which may be based on a use of the focused scan, one or more characteristics of the environment, characteristics of the sensors, characteristics of the system in which the sensors are integrated, and the like. As an example, a sensor or sensor array may initially transmit a "chirp" and utilize a wide field mode, then utilize a narrower field mode to better localize targets of interest in an environment.

In one or more embodiments, electronic device 100 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

Figure 2A:
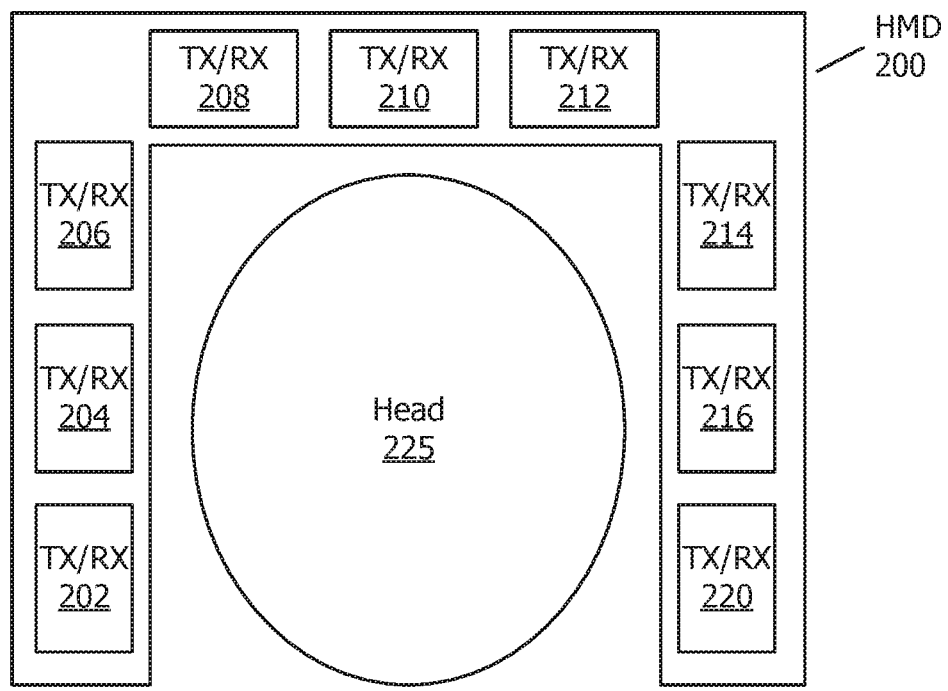
FIG. 2A shows an example system diagram in which techniques described herein may be practiced, according to one or more embodiments.

Turning to FIG. 2A, an example electronic device 200 comprising a set of ultrasonic sensors is presented. As shown, in one or more embodiments, the device may include a uniform or non-uniform array of sensors. For purposes of the example shown, ultrasonic sensors with the capability of transmitting and receiving signals may be distributed across three sides of an electronic device. That is, TX/RX 202, TX/RX 204, and TX/RX 206 may be distributed across a first side, while TX/RX 208, TX/RX 210, and TX/RX 212 may be distributed across a second side, and TX/RX 214, TX/RX 216, and TX/RX 220 may be distributed across a third side.

Figure 2B:
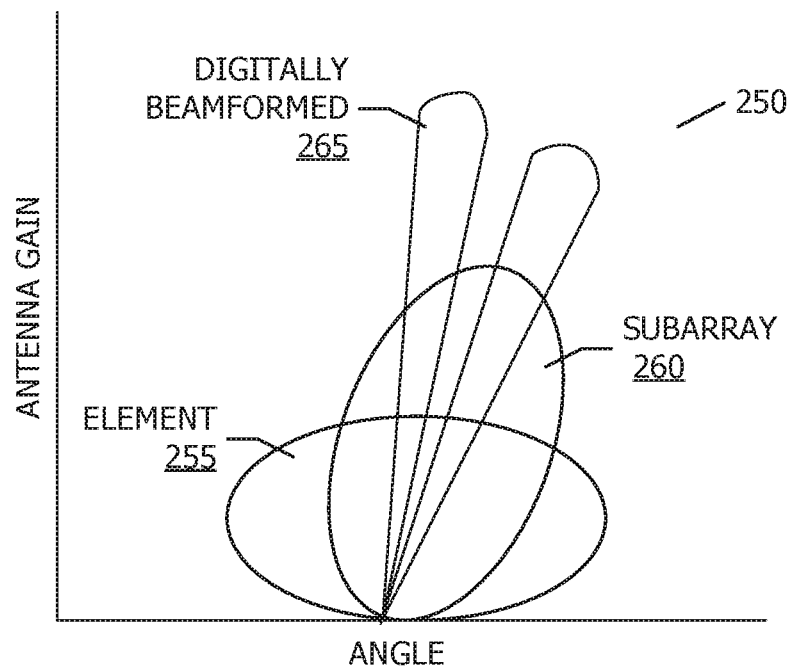
FIG. 2B depicts an example field of view chart for an ultrasonic sensor array, according to one or more embodiments.

FIG. 2B shows an example chart 250 illustrating the field of view of various combinations of the ultrasonic sensors shown above may be utilized in various combinations to manipulate a field of view. As an example, the coverage of a single element 255, for example, a single ultrasonic sensor (e.g., ultrasonic transducer), may cover a wide angle, but may provide a short range of view. By contrast, the field of view of a subarray 260 (e.g., two or more ultrasonic sensors)

may be more direct (e.g., a smaller view angle), but may provide more depth. Further, the various arrays of sensors may be utilized for digital beamforming. A digitally beamformed field of view 265 may be even more direct, but provide more depth than simply using a subarray or a single element.

Figure 3:
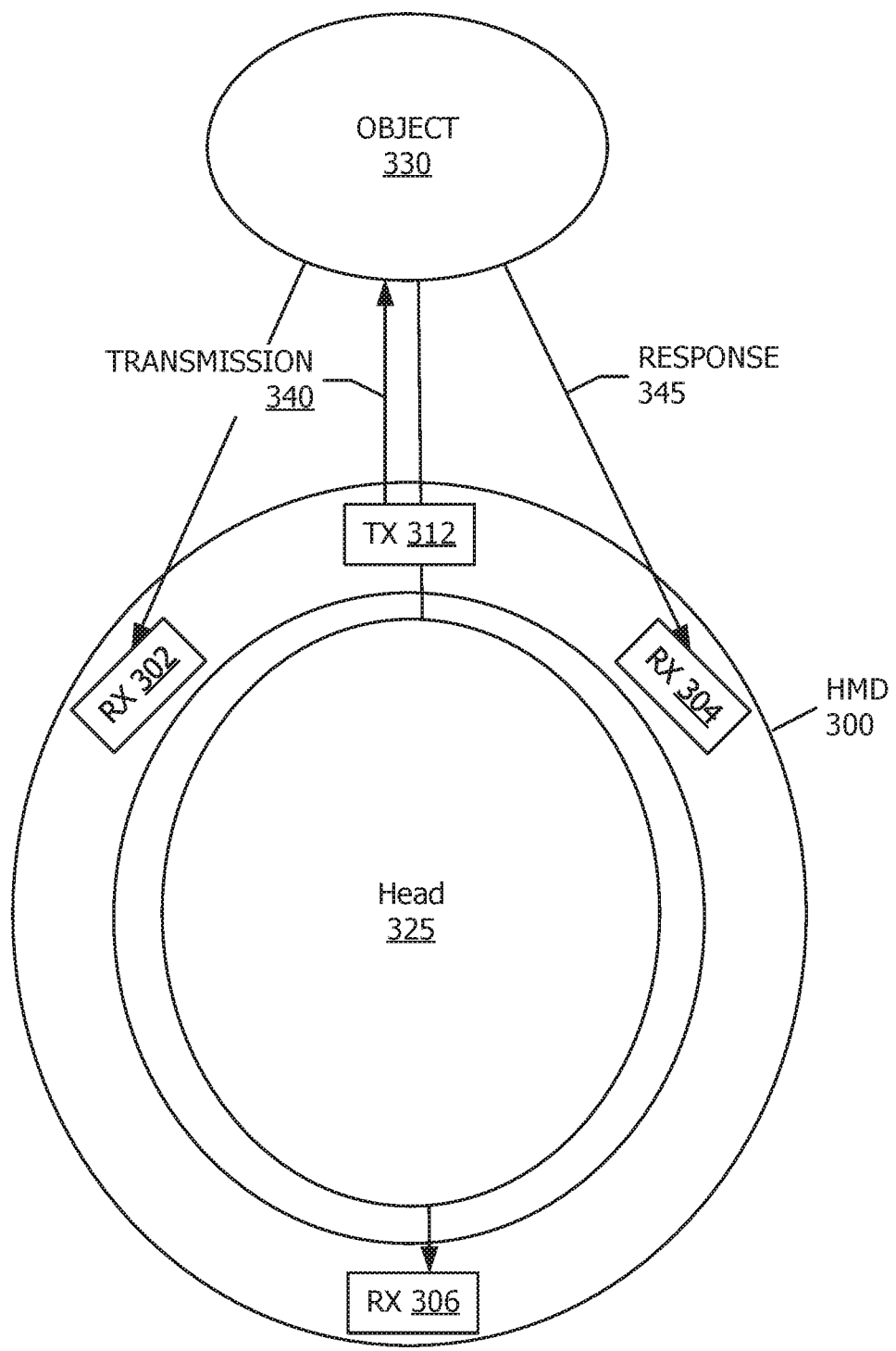
FIG. 3 depicts an example system setup in which an object may be detected, according to one or more embodiments.

Turning to FIG. 3, according to one or more embodiments, sensors may be integrated onto a system, such as a head mounted device 300, in any manner, such as a manner that improves the design of the head mounted device to fit around a head 325, or in an aesthetically pleasing manner. That is, the sensors may be incorporated into a system in the form of a uniform or non-uniform array. As shown, one example configuration may include three ultrasonic sensors 302, 304, and 312 around a front arc of a rounded device, while a fourth ultrasonic sensors 306 may be affixed in an opposite side of the device. To do so, individual sensors may be synchronized to each other. There may additionally, or alternatively be sub-arrays, which include hard-wired arrays of ultrasonic sensors which are preconfigured to be synchronized with each other. For example, each sensor may have its own time base. The time bases of the individual sensors may be linked, for example, through a bus that communicatively couples the various ultrasonic sensors. For example, sensors may be linked through a round robin or other configuration to determine which sensor transmits and which receives.

Further, in one or more embodiments, the sensor which transmits and/or receives may configurable, for example, based on contextual information of the system in which the sensors are integrated. In one example, a forward-facing sensor 312 may be selected as a transmitting sensor more often if it is determined that more obstacles are likely in a forward-facing direction. As such, the forward-facing sensor 312 may provide a transmission 340 toward an object 330 in an environment. The direction of the obstacles may be based on, for example, a direction of movement of a system in which the sensors are placed, historic or current information regarding objects in the environment, ultrasonic sensor data, other sensors data (e.g., depth sensors). Additional sensors 302, 304, and 306 may be configured as receiving sensors which may detect signals transmitted from the forward-facing sensor 312 and received from an object 330 in an environment. As such, sensors 302, 304, and 306 may receive response signals 345 as they bounce off the object 330 in the environment.

Figure 4:
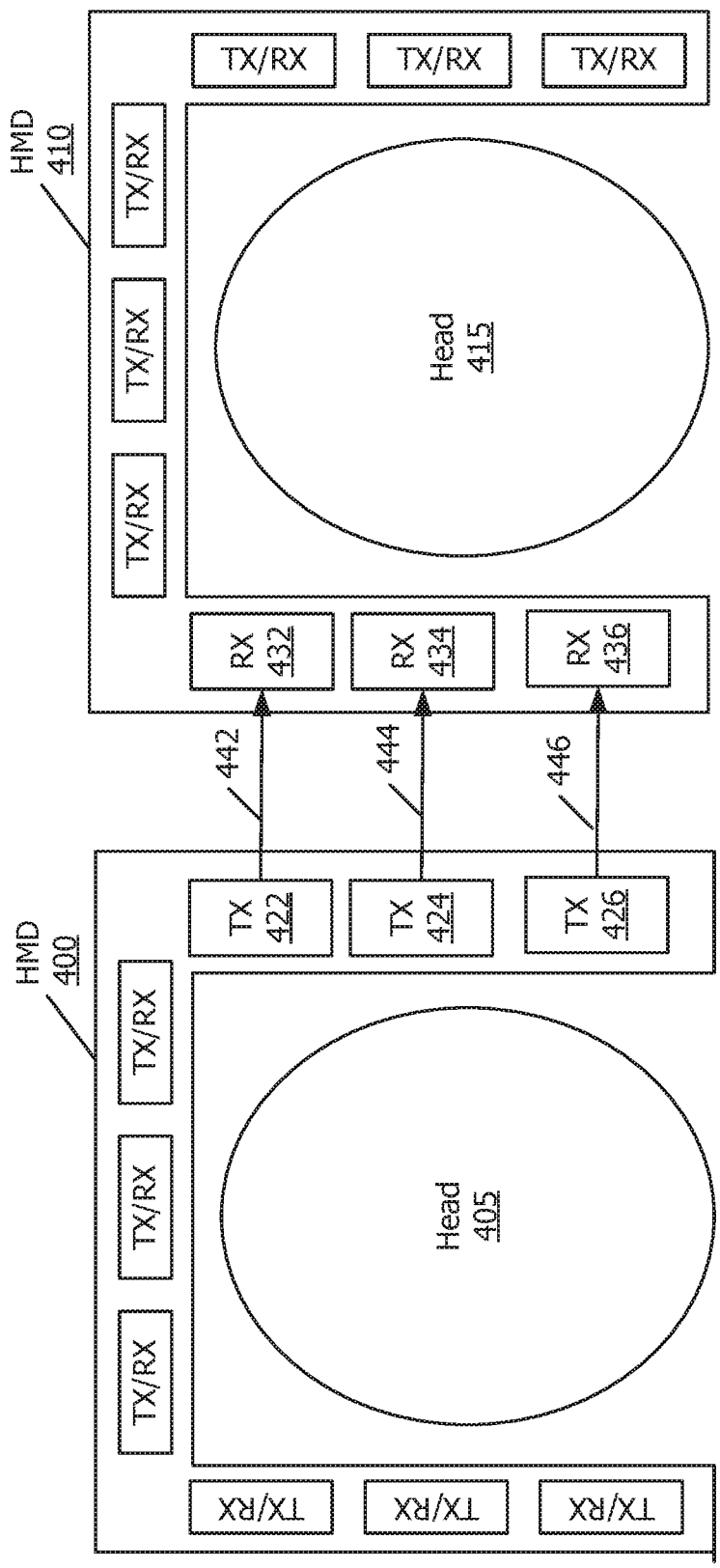
FIG. 4 depicts a network diagram in which techniques described herein may be practiced.

According to one or more embodiments, two or more head mounted devices integrated with ultrasonic sensors may be in a same environment, such as two people using separate systems in a room, as shown in FIG. 4. Each system (e.g., HMD 400 and HMD 410) may have a set of ultrasonic sensors, and the sensors among the systems may be timed against each other through channel adaptation. According to one or more embodiments, HMD 400 may be mounted on head 405, while HMD 410 may be mounted on head 415. Although the sensors are depicted in a particular configuration, it should be understood that alternative configurations may be used. Each head mounted device may be associated with a dedicated time frame or time frames to listen to a channel. As an example, each system may listen to a channel for a predetermined amount of time and may alternate listening to a channel and utilizing the channel for transmission. Further, in one or more embodiments, the sensors on a particular head mounted device may be timed based on a location of another sensor on another head mounted device. For example, HMD 400 may determine that HMD 410 is to the right of HMD 400. Additionally, or alternatively, HMD 400 may determine to utilize sensors 422, 424, and 426 to transmit signals 442, 444, and 446 based on a determination that sensors 432, 434, and 436 are facing in the sensors 422, 424, and 426. In that manner, the sensors on the two devices could cooperate to establish or maintain a timebase used for interference mitigation. In one or more embodiments, a back channel may not be necessary. One head mounted system may listen and through a data interface (e.g., Wi-Fi, Bluetooth, etc.), can indicate to a transmitting device that it can hear the transmitting device. As such, the two or more systems 400 and 410 may determine how to avoid interference among the ultrasonic sensors automatically. In one or more embodiments, an ultrasonic transmission may hit an object in an environment and return back to the device such that the device detects a primary return, as well as a secondary return, tertiary return, and the like. In one or more embodiments, if you have one HMD transmitting, it can separate itself from other noise and determine where the first response is coming from in the room. According to one or more embodiments, the transmitting system may indicate to a second or additional system that a first response belonged to the transmitting system. In one or more embodiments, by only transmitting during an open window based on these features, then power savings may occur.

In one or more embodiments, on any one device, there is a possibility that the sensors may interfere with each other. According to one or more embodiments, one or all of the sensors may have a dedicated time to listen to all the transmissions such that a transmission time for the sensors among the sensors on the head mounted device may be determined. According to one or more embodiments, the sensors on a single device may utilize the physical structure within which the sensors are integrated to leverage transmission among the sensors. That is, because the energy will travel faster through the head mounted device than through the environment, sensors within a single device may determine that a transmission from another sensor is expected. As such, if a transmission is detected through the physical device, then a sensor may wait until the corresponding response is received from the environment prior to transmitting itself. Further, in one or more embodiments, the secondary sensor may transmit in phase or 180 degrees out of phase in order to cancel out the primary sensor's energy.

In one or more embodiments, the sensor may be augmented with a lens, such as a plastic lens, to change the field of view. In one or more embodiments, one or more of the ultrasonic sensors on the head mounted device may be augmented by including a piezoelectric membrane on top of the sensor that can become adjustable in terms of convex or concave, and thus would the field of view may be modified.

According to one or more embodiments, a cavity may be included in the head mounted device to be utilized as an ultrasonic aperture. As such, the cavity may act as an antenna for the ultrasonic sensor in the head mounted device. In one or more embodiments, the device itself may also be used. For example, physical characteristics of the device in relation to the placement of the ultrasonic sensors may act as an antenna.

Referring now to FIG. 5, an example flowchart is depicted illustrating an example technique for object detection, according to one or more embodiments. It should be understood that the particular flow of processes is merely presented as an example. In one or more embodiments, not all described processes may be required, and in one or more embodiments, one or more of the described processes may be omitted or performed in a different order. Moreover, two or more of the processes may be performed concurrently, according to one or more embodiments.

The flowchart begins at 505 where a first device, such as electronic device 100 transmits a first pulse into an environment using a first configuration of an ultrasonic sensor array. In one or more embodiments, at 510, the electronic system detects a remote system in the environment, such as a second HMD or other electronic device configured with an ultrasonic sensor array. The flowchart continues at 515 where the electronic device 100 transmits the first pulse into the environment. The first pulse may be transmitted by a single ultrasonic transmitter or multiple ultrasonic transmitters. According to one or more embodiments, at 525, the electronic device transmits an indication to the remote system that the first pulse originated at the electronic device 100. As such, the electronic device 100 may provide the remote system with contextual information regarding the source of the pulse such that the echo as detected by the remote device will be associated with a source.

The flowchart continues at 530 where the electronic device 100 detects an echo associated with the first pulse. As described above, the echo may be detected by a detector ultrasonic sensor. Further, in one or more embodiments, the echo may be detected by multiple sensors of the electronic device 100. At 535, the electronic device 100 may determine a targeted configuration based on the detected echo. In one or more embodiments, the targeted configuration may be based on how the echo is detected. For example, at 540, the echo may be detected by multiple receiver sensors at different times. At 545, the electronic device may determine the targeted configuration based on the sensors that detected the echo, along with the time each receiver detected the echo. As an example, if a left sensor detected the echo prior to the right sensor, the targeted configuration may include a configuration that will provide a beamformed transmission in a left direction based on the times at which the sensors detected the echo. In one or more embodiments, the particular times may be analyzed to determine a more specific direction at which a targeted configuration should be directed. The flowchart continues at 550 where the electronic device transmits a second pulse into the environment using the targeted configuration.

The flowchart concludes at 555 where the electronic device 100 determines a characteristic of the object based on a detected echo associated with the second pulse.

Figure 6:
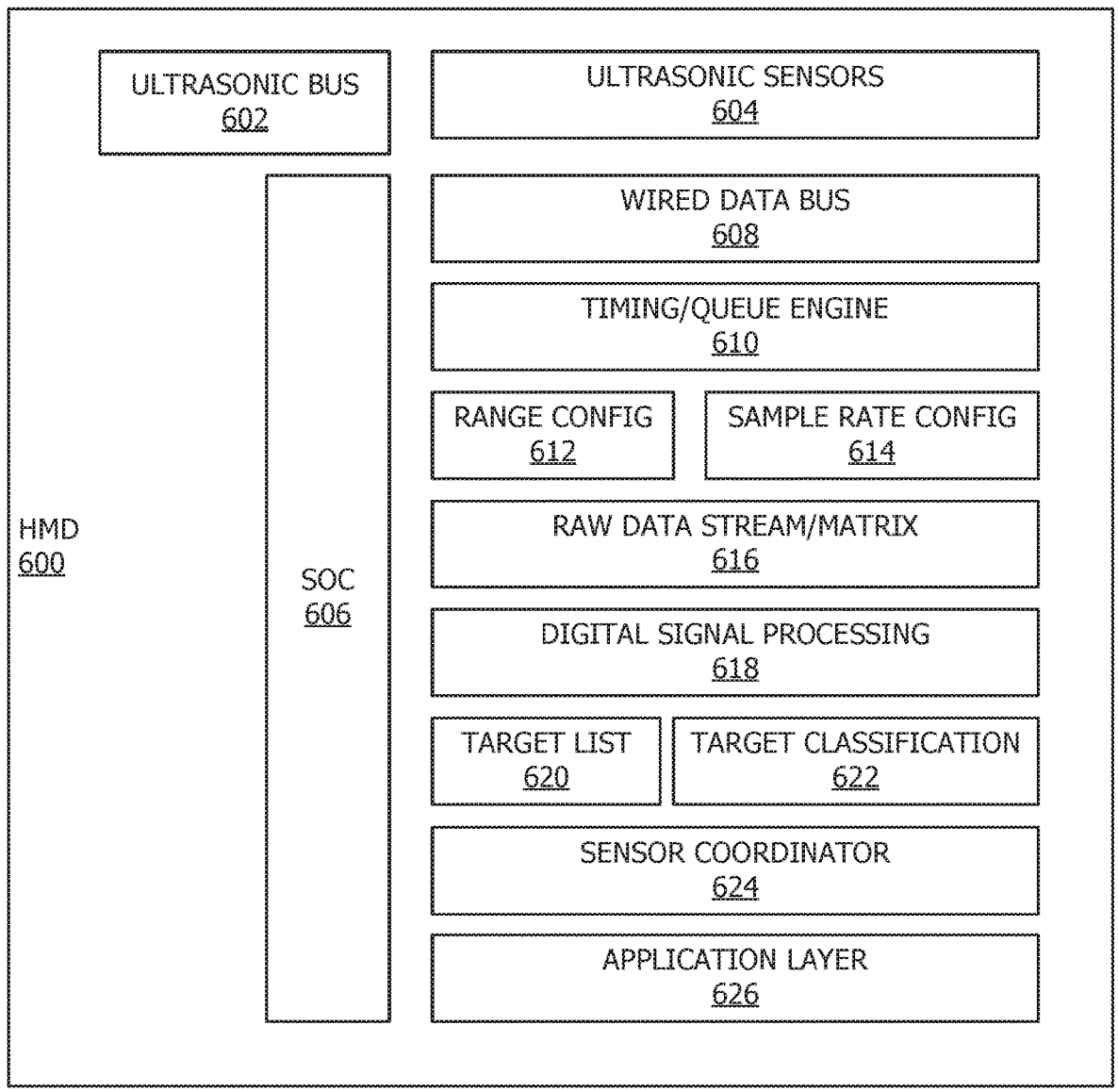
FIG. 6 shows, in block diagram form, a simplified system diagram according to one or more embodiments.

Referring now to FIG. 6, an example system architecture is provided which may be utilized by the electronic system 100. The example architecture may be comprised in a head mounted device 600. The head mounted device 600 may include a set of ultrasonic sensors 604 which may be connected across an ultrasonic bus 602. The HMD 600 may also include a module such as a system-on-chip ("SoC") 606 which may be utilized to drive the ultrasonic sensors and/or may be utilized to detect objects in an environment utilizing the ultrasonic sensors.

HMD 600 may include additional components, such as a wired data bus 608. The wired data bus 608 may be utilized to transmit data across various components and modules of HMD 600. A timing/queue engine 610 may be used to provide a timebase for the various ultrasonic sensors 604, either individually or in combination. The timing information may be communicated across the ultrasonic sensors, for example, utilizing the wired data bus 608. The coordination among sensors within HMD 600, and/or across remote devices may be managed by sensor coordinator module 624.

HMD 600 may include a range configuration 612 and a sample rate configuration 614. In addition, HMD 600 may include a target list 620 and target classification module 622. Finally, HMD 600 may include an application layer 626 by which sensor data from the ultrasonic sensors 604 may be utilized by other applications in the electronic device 100.

Figure 7:
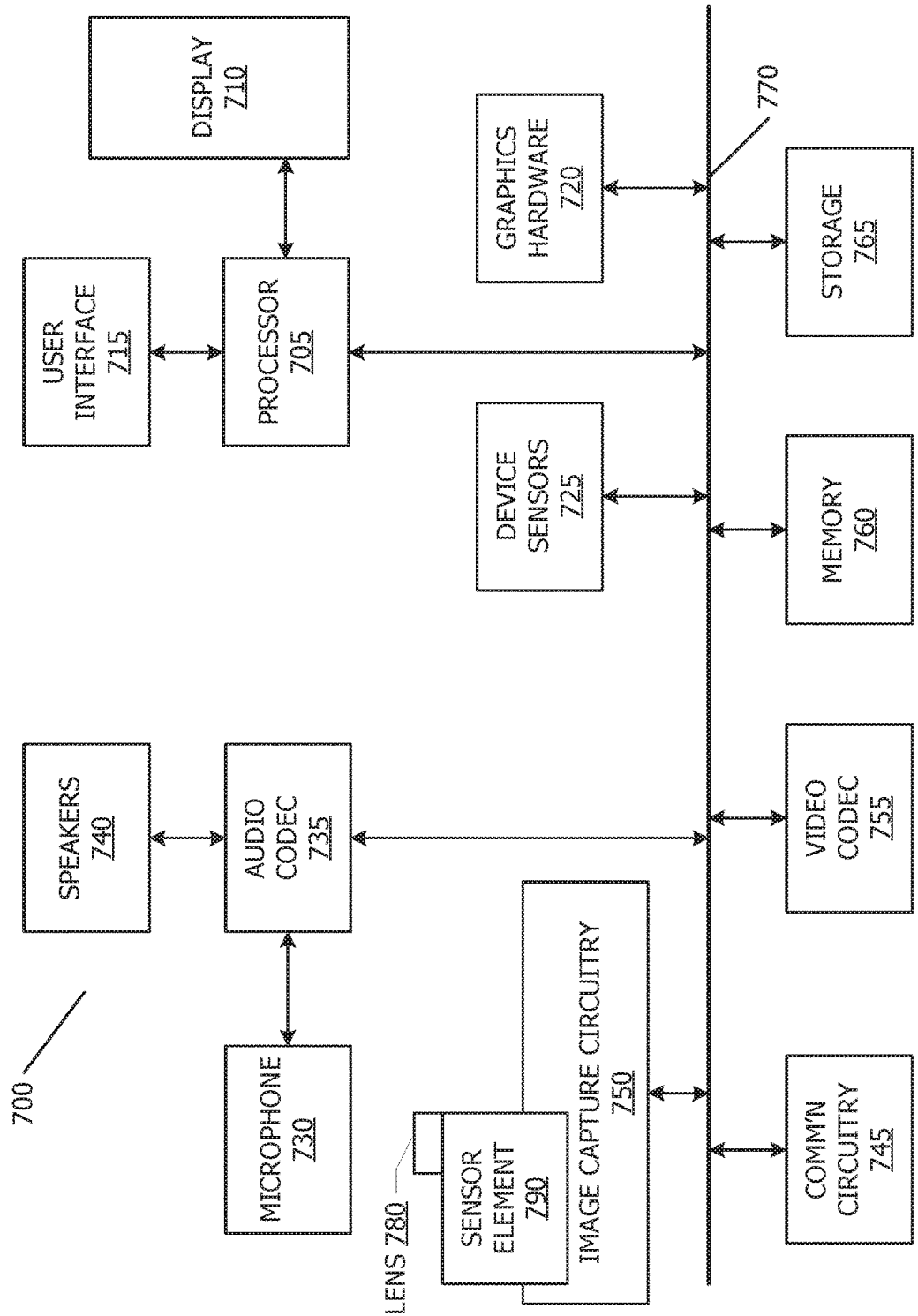
FIG. 7 depicts an example system diagram of an electronic device by which techniques described herein may be performed, according to one or more embodiments.

Referring now to FIG. 7, a simplified functional block diagram of illustrative multifunction device 700 is shown according to one embodiment. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system 100) video codec(s) 755 (e.g., in support of digital image capture unit 750), memory 760, storage device 765, and communications bus 770. Multifunction electronic device 700 may be, for example, a digital camera or a personal electronic device such as a personal digital assistant (PDA), personal music player, mobile telephone, a tablet computer, or a head mounted device.

Processor 705 may execute instructions necessary to carry out or control the operation of many functions performed by device 700 (e.g., such as the generation and/or processing of images and single and multi-camera calibration as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include lens assembly 780 associated with sensor element 790. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within circuitry 765. Images so captured may be stored in memory 760 and/or storage 755.

Sensor and camera circuitry 750 may capture still and video images that may be processed in accordance with this disclosure, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory computer readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of object detection, comprising:
transmitting, by a first device, a first pulse into an environment using a wide field configuration of an ultrasonic sensor array;
detecting a presence of an object in the environment based on a detected echo based on the first pulse;
in response to detecting the presence of an object in the environment:
determining a targeted configuration of the ultrasonic sensor array, comprising:
detecting the echo at a first ultrasonic sensor of the ultrasonic sensor array at a first time,
detecting the echo at a second ultrasonic sensor of the ultrasonic sensor array at a second time,
wherein the targeted configuration is determined based in part on the first time and second time; and
transmitting a second pulse into the environment based on the targeted configuration,
wherein a characteristic of the object is determined based on a detected echo from the second pulse.

2. The method of claim 1, wherein the first ultrasonic sensor and the second ultrasonic sensor are associated with different fields of view.

3. The method of claim 1, wherein the first ultrasonic sensor and the second ultrasonic sensor are associated with a same timebase.

4. The method of claim 1, wherein transmitting the second pulse into the environment further comprises:
determining a time frame reserved for transmissions by the first device;
in response to determining that a current time is within the time frame, transmitting the second pulse in to the environment.

5. The method of claim 1, further comprising:
detecting a remote system in the environment;
determining a channel for transmission based on the detection of the remote system; and
transmitting the first pulse based on the determined channel.

6. The method of claim 5, wherein transmitting the first pulse comprises:
transmitting an indication to the remote system that the echo associated with the
first pulse is associated with the transmission from the first system.

7. A non-transitory computer readable medium comprising computer readable code executable by one or more processors to:
transmit, by a first device, a first pulse into an environment using a wide field configuration of an ultrasonic sensor array;
detect a presence of an object in the environment based on a detected echo based on the first pulse;
in response to detecting the presence of an object in the environment: determine a targeted configuration of the ultrasonic sensor array, comprising:
detecting the echo at a first ultrasonic sensor of the ultrasonic sensor array at a first time, detecting the echo at a second ultrasonic sensor of the ultrasonic sensor array at a second time,
wherein the targeted configuration is determined based in part on the first time and second time; and
transmit a second pulse into the environment based on the targeted configuration, wherein a characteristic of the object is determined based on a detected echo from the second pulse.

8. The non-transitory computer readable medium of claim 7, wherein the first ultrasonic sensor and the second ultrasonic sensor are associated with different fields of view.

9. The non-transitory computer readable medium of claim 7, wherein the computer readable code to transmit the second pulse into the environment further comprises computer readable code to:
determine a time frame reserved for transmissions by the first device;
in response to determining that a current time is within the time frame, transmit the second pulse in to the environment.

10. The non-transitory computer readable medium of claim 7, further comprising computer readable code to:
detect a remote system in the environment;
determine a channel for transmission based on the detection of the remote system; and
transmit the first pulse based on the determined channel.

11. The non-transitory computer readable medium of claim 10, wherein the computer readable code to transmit the first pulse comprises computer readable code to:
transmit an indication to the remote system that the echo associated with the first
pulse is associated with the transmission from the first system.

12. A system, comprising: one or more processors; and one or more computer readable medium comprising computer readable code executable by one or more processors to: transmit, by a first device, a first pulse into an environment using a wide field configuration of an ultrasonic sensor array; detect a presence of an object in the environment based on a detected echo based on the first pulse; in response to detecting the presence of an object in the environment: determine a targeted configuration of the ultrasonic sensor array, comprising: detecting the echo at a first ultrasonic sensor of the ultrasonic sensor array at a first time, detecting the echo at a second ultrasonic sensor of the ultrasonic sensor array at a second time, wherein the targeted configuration is determined based in part on the first time and second time; and transmit a second pulse into the environment based on the targeted configuration, wherein a characteristic of the object is determined based on a detected echo from the second pulse.

13. The system of claim 12, wherein the first ultrasonic sensor and the second ultrasonic sensor are associated with different fields of view.

14. The system of claim 12, wherein the computer readable code to transmit the second pulse into the environment further comprises computer readable code to:
determine a time frame reserved for transmissions by the first device;

in response to determining that a current time is within the time frame, transmit the second pulse in to the environment.

15. The system of claim 12, further comprising computer readable code to:
  detect a remote system in the environment;
  determine a channel for transmission based on the detection of the remote system; and
  transmit the first pulse based on the determined channel.

16. The system of claim 15, wherein the computer readable code to transmit the first pulse comprises computer readable code to:
  transmit an indication to the remote system that the echo associated with the first
  pulse is associated with the transmission from the first system.

* * * * *